(No Model.) 3 Sheets—Sheet 1.
H. C. HICKS.
TRACTION ENGINE.
No. 493,267. Patented Mar. 14, 1893.
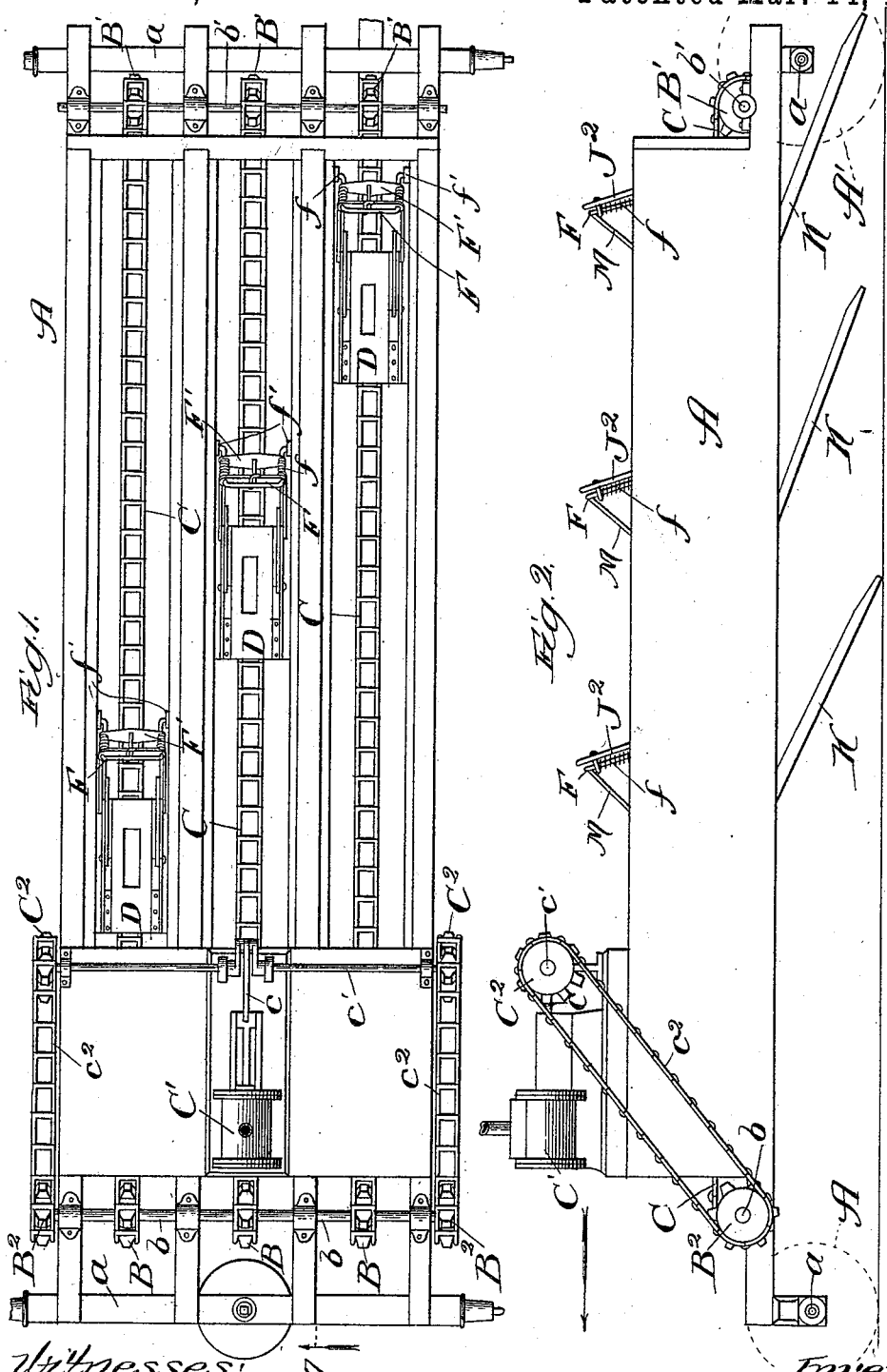
Witnesses:
Chas E Gaylord
Clifford N White
Inventor:
Henry Clinton Hicks,
By Banning & Banning & Payson,
Attys.

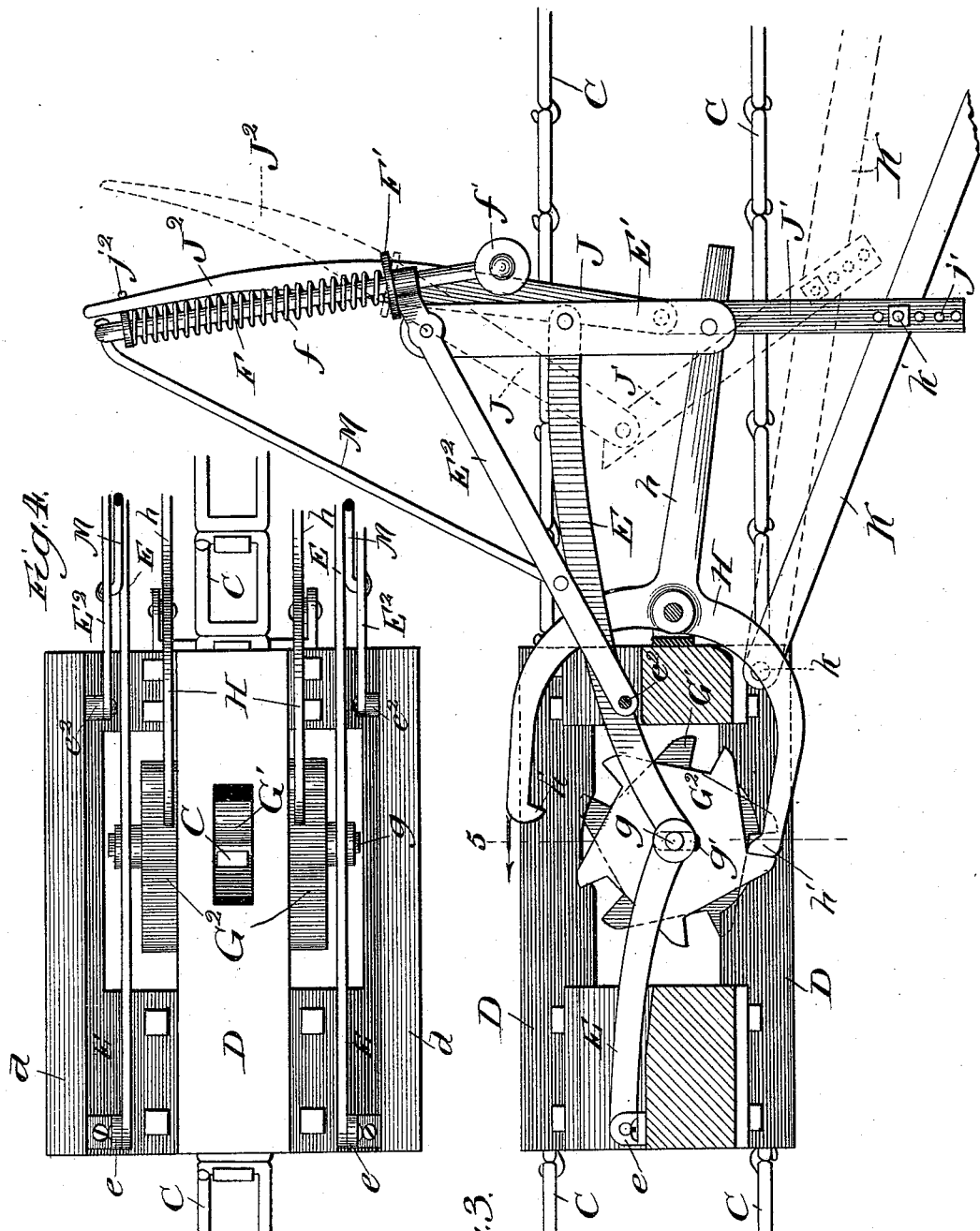

(No Model.) 3 Sheets—Sheet 3.
H. C. HICKS.
TRACTION ENGINE.
No. 493,267. Patented Mar. 14, 1893.
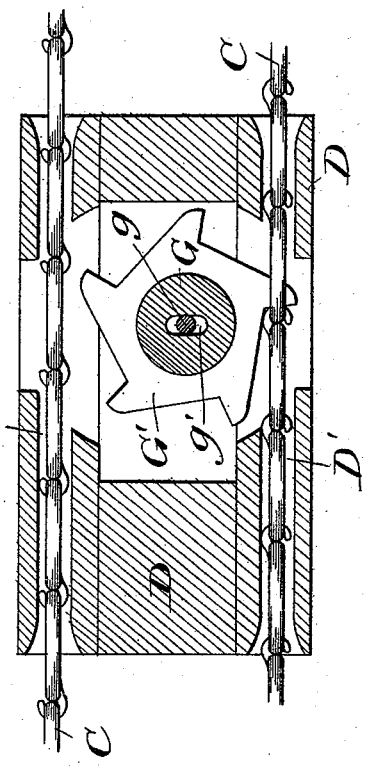
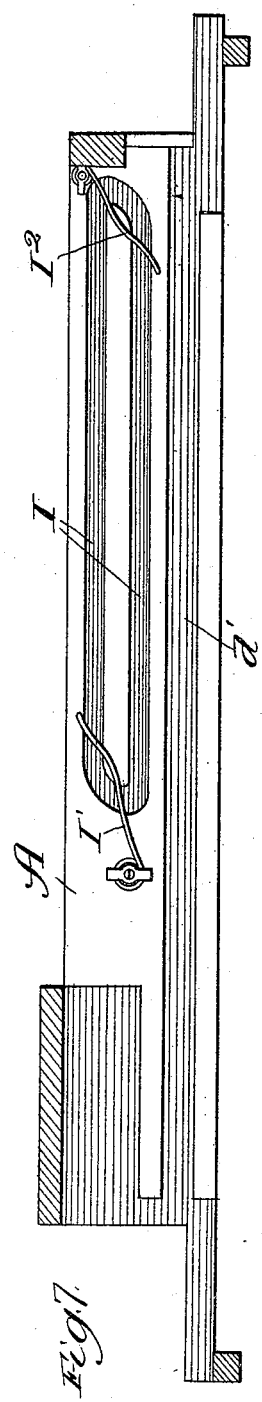
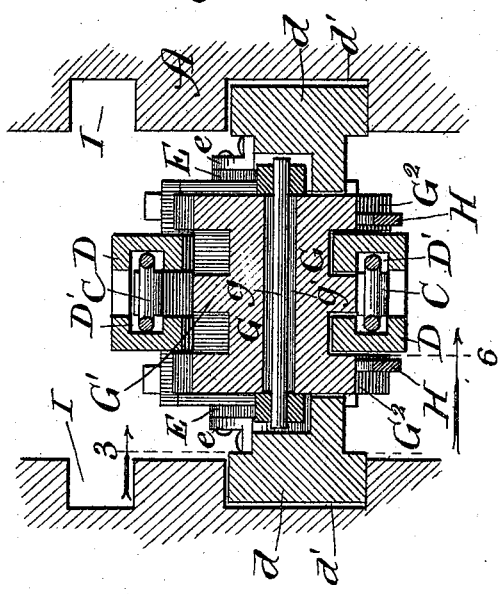
Witnesses:
Chas. E. Gaylord,
Clifford N. White.
Inventor:
Henry Clinton Hicks,
By Banning & Banning & Payson,
Attys.

UNITED STATES PATENT OFFICE.

HENRY CLINTON HICKS, OF CHICAGO, ILLINOIS.

TRACTION-ENGINE.

SPECIFICATION forming part of Letters Patent No. 493,267, dated March 14, 1893.

Application filed June 14, 1892. Serial No. 436,664. (No model.)

*To all whom it may concern:*

Be it known that I, HENRY CLINTON HICKS, a citizen of the United States, residing at Chicago, Cook county, Illinois, have invented certain new and useful Improvements in Traction-Engines, of which the following is a specification.

A practical and efficient motor or traction engine for farm and other work has long been sought after, and many attempts and experiments have been made to produce such an engine. Some of these attempts have been attended with a greater or less degree of success, while others have resulted in actual failure or the production of a machine which, while correct theoretically, has proved impracticable or inefficient in use.

The object of my invention is to construct such an engine, adapted for various uses and capable of transporting itself from place to place, and, with this object in view, I have, after careful consideration and experiment, succeeded in devising the machine hereinafter to be more particularly described. In this engine the power is applied with the utmost directness and consequent efficiency, and, stated generally, the principle of my invention consists in providing a moving endless belt or chain, the propelling mechanism being alternately brought into engagement with such belt or chain and disengaged therefrom, and the manner of working out this principle will be made apparent from the descriptions to follow hereinafter.

My invention consists in the features and combinations hereinafter described and claimed.

In the drawings, Figure 1 is a plan view of a traction engine embodying my invention; Fig. 2 a side elevation thereof; Fig. 3 a section on line 3 of Fig. 5; Fig. 4 a view of a portion of the machine shown in Fig. 1; Fig. 5 a section on line 5 of Fig. 3; Fig. 6 a section on line 6 of Fig. 5; and Fig. 7 a section on line 7 of Fig. 1—all of the sections being taken in the directions indicated by the respective arrows, and Figs. 3, 4, 5 and 6 being upon an enlarged scale.

The frame or body, A, of the machine may be made of any suitable material, and of the proper form and dimensions to accommodate and permit of the efficient operation of the working parts of the apparatus hereinafter to be described; and I do not wish to be understood as limiting myself in any way to the particular form given to this frame or body in the drawings. The body shown is mounted upon axles $a$, upon which are wheels A′ upon which the machine travels. At suitable points near the ends of this body are journaled shafts $b, b'$, and on these shafts are mounted sprocket wheels B B′, upon which travel endless chains C. I have shown in the drawings three of these endless chains, together with three sets of devices adapted to operate in connection therewith and the sprocket wheels intended to drive them, but any greater or less number may be used as desired, and I have merely shown three as an illustration of my invention, and in no way as a limitation upon its scope.

An engine or motor C′, of any desired form, is mounted at a suitable point upon the body, its piston rod $c$ connecting, as shown, with a crank on a shaft $c'$, on which shaft are mounted sprocket wheels $C^2$, over which run chains $c^2$, which also pass over sprocket wheels $B^2$ on the shaft $b$, whereby motion is imparted to this shaft and the endless chains. I next construct the traveling clutch blocks D, made all substantially alike. These blocks are provided with guides $d$, which travel in grooves $d'$, made in the body of the engine (Figs. 5 and 7), and furthermore have slots or passage ways D′, through which the endless chain C passes. (Figs. 5 and 6.)

Levers E, preferably of the form shown more particularly in Fig. 3, are pivoted at one end to the sliding block, as shown at $e$, and are connected at the other end to a frame E′, there being two of these levers to each of the sliding blocks, as shown more particularly in Figs. 3 and 4. The frame E is also provided with arms or links $E^2$, pivoted as shown at $e^2$ to the sliding block. These arms $E^2$ carry a yoke F on which slides a plate or washer F′, normally forced down by springs $f$. The purposes of this device will be described hereinafter, for the present we must go back to the sliding block and describe the clutch mechanism carried thereby.

A shaft $g$ is journaled, as shown, in the arms or levers E, moving in a slot $g'$ to allow play, and on this shaft is mounted a drum G, carrying toothed wheels G', G². These wheels are all shown as part of an integral drum in the drawings, but they might be made separate from each other and secured together if desired. The wheels G', which I term "clutch wheels," are placed in line with the endless chain C, and are adapted to engage with either the upper or lower strand thereof, being shown in engagement with the lower strand in Fig. 6.

Pivoted to the blocks D are Y-shaped levers H, the straight arms $h$ of these levers being connected as shown to the frame E', while the curved arms pass both above and below the locking wheels G², and are formed as shown at $h'$ to engage with the teeth of these wheels, to hold them and the clutch wheel from revolving.

The ends of the yoke F extend down below the arms E² and carry rollers $f'$, which rollers are adapted to travel in grooves I formed in the body of the engine. Springs I', I² extend across the ends of these grooves, and serve to direct the rollers from the upper to the lower part of the grooves to properly operate the propelling devices.

Secured to the plate F, in such manner as to be free to rock thereon, is a yoke J, to the lower ends of which are pivotally secured arms J'. The pusher arm K is pivotally secured at $k$ to the traveling block, and is fastened between the arms J' by means of a bolt $k'$, which is adapted to pass through any one of a number of holes $j'$, whereby this arm may be adjusted at any desired height. An operating handle J² is secured to the yoke J, being normally held against the yoke F by means of a catch $j^2$. The upper end of the yoke F is preferably braced by means of rods M, connected at one end to the yoke and at the other to the arms E².

The device having been constructed and put together as above described operates in the following manner, power being applied to revolve the shafts and impart motion to the sprocket wheels and endless chain, as already described. We will refer to the traveling block shown at the left hand of Fig. 1, and suppose that the parts thereof are in the position shown in Fig. 3, the lower arms of the levers H being in engagement with the locking wheels G² to hold them from rotating, and a tooth of the clutch wheel G' being in engagement with the lower strand of the endless chain C, which strand is traveling toward the right, Figs. 1 and 2. In this position the pusher arm will be down, and in engagement with the ground ready to work, the rollers $f'$ being in the lower part of the grooves I. As now the lower strand of the chain travels toward the right, it will tend, through its engagement with the clutch wheel, to revolve the same, but as this wheel is rigidly held from revolution, the tendency of the chain will be to move the block along with it toward the right. The pusher arm, however, will be in contact and engagement with the ground, and the consequence will be that, instead of the block moving toward the right, the engine will be forced toward the left, sliding upon the block and traveling along the ground. When the rollers $f'$ reach the right hand end of the grooves in which they are traveling they will come in contact with the springs I² at that end, and, forcing the springs slightly toward the right, will be guided thereby into the upper part of the groove. As the rollers rise into the upper part of the groove, they will carry with them the frame E', to which they are connected, thereby rocking the levers E, and raising the clutch wheel G out of engagement with the lower strand of the chain to bring it into engagement with the upper strand. At the same time the Y-shaped levers H will be rocked to withdraw their lower arms from the teeth of the locking wheels G², and bring their upper arms into engagement therewith. The arms J' will also be moved upward, raising the pusher arm from the ground. As the clutch wheel G' is raised, one of its teeth will be caught by one of the links in the upper strand of the endless chain, and, as this chain is in motion toward the left, it will tend to revolve the sprocket wheel. This, however, is now held from revolution by the engagement of the upper arms of the levers H with the teeth of the locking wheels G², consequently this motion of the chain will carry along with it the traveling block, the pusher arm, and the other parts of the apparatus connected to or supported by said block. The parts will continue in this position while the rollers are traveling in the upper parts of the grooves I, but as these rollers reach the left hand end of these grooves, they will contact with the springs I', situated at such ends, which springs will direct the rollers into the lower part of the groove, move the frame and the pusher arm downward, and, reversing the operation above described, will disengage the clutch wheel G' from the upper strand of the chain, and bring it into engagement with the lower strand, the locking wheels G² being at the same released from the upper arms of the Y-shaped levers H, and engaged by the lower arms. The same series of operations will be performed by each of the sliding blocks with its operating parts, and in Fig. 1 I have shown one of these blocks that at the left hand end ready to commence work; the one in the middle as half way back; and the one at the right hand end having finished its work and being ready to start back again in engagement with the upper strand of the endless cable. It will be noticed that the pusher arm is supported by means of the plate F', and that this plate is free to slide up and down upon the yoke F, the pusher arm being normally held downward by means of the spring. By this means this arm, while forced downward in such a manner as to be properly operated, is capable of yielding or rising slightly to pass obstructions. It may also be necessary, for various reasons, to raise this pusher arm entirely off the ground. To accomplish this, I release the handle J² from the hook j² and draw it back into the position indicated in dotted lines in Fig. 3. This immediately operates the arms J' and raises the pusher arm from the ground, as shown. In this way, as the pusher arms are forced back one after another, the motor will be caused to travel over the ground, in order to transport itself from place to place, or, when in operation, to enable it to draw plows for the purpose of plowing, or to carry out various other operations for which it is adapted. If desired, the endless chain can be disconnected, and the engine used to drive the thrasher or other similar machine, and, in general, my device can be used for a great number of purposes in connection with farming, or in any other places where a self-transporting motor is desired.

While I have described more or less precise means, I do not intend to unduly limit myself thereto, but contemplate changes in form and proportion, and the substitution of equivalent members as may be desirable or necessary; as, for example, some other form of endless chain or belt may be substituted for the sprocket chain shown, and various other changes may be made, without departing from the spirit of my invention.

I claim—

1. In a traction engine, the combination of an endless chain, means for imparting motion thereto, and a traveling block carrying a pressure arm and adapted to be alternately brought into engagement with the upper and lower strands of the endless chain, substantially as described.

2. In a traction engine, the combination of an endless chain, means for imparting motion thereto, a traveling block carrying a clutch wheel, a pusher arm, and means for bringing the clutch wheel on the traveling block into engagement alternately with the upper and lower strands of the endless chain, substantially as described.

3. In a traction engine, the combination of a frame or body, an endless chain supported therein, means for driving such chain, a traveling block sliding in the body and carrying a pressure arm, and means whereby such block is engaged and operated by the upper and lower strands of the endless chain alternately, substantially as described.

4. In a traction engine, the combination of a frame or body, an endless chain supported therein, means for driving such chain, a sliding block carrying a pressure arm, and means whereby the block is operated upon alternately by the upper and lower strands of the endless chain, whereby as the block is in engagement with one of such strands it will be moved in the body, and as the block is in engagement with the other strand the body will be moved on the block, substantially as described.

5. In a traction engine, the combination of a frame or body, an endless chain supported upon suitable wheels journaled in such body, means for imparting motion to the chain, a block sliding in ways in such body carrying a pressure arm and a clutch wheel, and means whereby the wheel is alternately brought into engagement with the upper and lower strands of the endless chain and held from revolving when in such engagement, substantially as described.

6. In a traction engine, the combination of a frame or body, an endless chain supported therein, means for imparting motion to such chain, a block sliding in the body and carrying a pressure arm, two rigidly connected clutch wheels mounted in such block, means whereby one of such wheels is brought alternately into engagement with the upper and lower strands of the endless chain, and mechanism engaging with the other wheel to prevent the revolution of the wheels when in engagement with the endless chain, substantially as described.

7. In a traction engine, the combination of a sliding block, a frame, arms pivoted to such block and attached to the frame, a shaft journaled in such arms and carrying a clutch wheel and a locking wheel, a lever pivoted to the block connected to the frame and adapted to engage with the locking wheel, a pressure arm pivoted to the block, and means whereby the clutch wheel is brought alternately into engagement with the upper and lower strands of the endless chain and the locking lever brought into engagement with the locking wheel to prevent the rotation of such wheels, substantially as described.

8. In a traction engine, the combination of a body or frame, sprocket wheels journaled in such body, an endless chain passing over such wheels, means for imparting movement to the chain, a clutch block sliding in guides in the frame, a frame E', arms pivoted to the clutch block and connected to the frame, a shaft journaled in such arms, a clutch wheel and two locking wheels mounted on such shaft and rigidly secured together, a Y-shaped locking lever pivoted to the block and connected to the frame E', a pressure arm pivoted to the block and supported in a yoke attached to the frame, rollers connected to the frame traveling in suitable guides in the body, and springs at the ends of such guides for acting upon and directing the rollers, whereby as the chain moves continuously the block engaging with one strand of the endless chain will be moved forward in the body and then, being brought into engagement with the other strand the body of the engine will be moved forward, substantially as described.

HENRY CLINTON HICKS.

Witnesses:
GEORGE S. PAYSON,
SAMUEL E. HIBBEN.